(12) United States Patent
del Val et al.

(10) Patent No.: US 7,185,082 B1
(45) Date of Patent: Feb. 27, 2007

(54) FAST DYNAMIC MEASUREMENT OF CONNECTION BANDWIDTH USING AT LEAST A PAIR OF NON-COMPRESSIBLE PACKETS HAVING MEASURABLE CHARACTERISTICS

(75) Inventors: David del Val, Madrid (ES); Thomas B. Brown, Redwood Shores, CA (US); Troy D. Batterberry, Kirkland, WA (US); William F. Schiefelbein, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 617 days.

(21) Appl. No.: 09/636,004

(22) Filed: Aug. 9, 2000

(51) Int. Cl.
G06F 15/16 (2006.01)
G06F 15/173 (2006.01)

(52) U.S. Cl. .................. 709/224; 709/225; 709/228; 709/233; 709/246

(58) Field of Classification Search ........ 709/223–224, 709/230–236, 227; 341/87; 370/469, 252; 435/29; 714/712; 712/34; 375/240.11; 351/205
See application file for complete search history.

(56) References Cited

U.S. PATENT DOCUMENTS

| 4,963,995 | A |  | 10/1990 | Lang |
|---|---|---|---|---|
| 5,057,932 | A |  | 10/1991 | Lang |
| 5,132,964 | A |  | 7/1992 | Esaki |
| 5,164,839 | A |  | 11/1992 | Lang |
| 5,262,875 | A |  | 11/1993 | Mincer et al. |
| 5,440,334 | A |  | 8/1995 | Walters et al. |
| 5,568,181 | A |  | 10/1996 | Greenwood et al. |
| 5,710,970 | A |  | 1/1998 | Walters et al. |
| 5,787,472 | A |  | 7/1998 | Dan et al. |
| 5,835,495 | A |  | 11/1998 | Ferriere |
| 5,890,010 | A | * | 3/1999 | Nishigami .................. 712/34 |
| 5,913,038 | A |  | 6/1999 | Griffiths |
| 5,931,961 | A | * | 8/1999 | Ranganathan et al. ...... 714/712 |
| 5,963,202 | A |  | 10/1999 | Polish |

(Continued)

OTHER PUBLICATIONS

Lai, Kevin and Baker, MAry; Measuring Bandwidth; Mar. 21-25, 1999; IFOCOM '99. Eighteenth Annual Joint Conference of the IEEE Computer and Communications Societies. Proceedings, IEEE, vol. 1.*

(Continued)

Primary Examiner—Rupal Dharia
Assistant Examiner—Quang N. Nguyen
(74) Attorney, Agent, or Firm—Lee & Hayes, PLLC

(57) ABSTRACT

The fast dynamic measurement of connection bandwidth utilizes a single pair of packets to calculate bandwidth between two entities on a network (such as the Internet). This calculation is based upon the packet-pair technique. This bandwidth measurement is extremely quick. On its journey across a network, communication equipment and modems may compress a packet. This compression shrinks the size of the packet; thus, it can distort the bandwidth calculation using such a shrunken packet. To avoid this distortion, the fast dynamic measurement of connection bandwidth employs non-compressible packets. More specifically, it employs highly entropic packets. Therefore, a packet cannot be compressed during its journey. In addition, on its journey across a network, packets may be rerouted, delayed, misrouted, and the like. These momentary delays may result in a momentary bad bandwidth calculation. This problem is ameliorated by using a history list at the client that keeps track of recent measurements. The client returns the median of that list to the server. That median is the specified bandwidth.

35 Claims, 6 Drawing Sheets

U.S. PATENT DOCUMENTS

| | | | |
|---|---|---|---|
| 5,978,567 | A | 11/1999 | Rebane et al. |
| 5,983,263 | A * | 11/1999 | Rothrock et al. ............ 709/204 |
| 5,995,705 | A | 11/1999 | Lang |
| 5,996,015 | A | 11/1999 | Day et al. |
| 6,005,621 | A * | 12/1999 | Linzer et al. ........... 375/240.11 |
| 6,014,706 | A | 1/2000 | Cannon et al. |
| 6,041,345 | A | 3/2000 | Levi et al. |
| 6,054,943 | A * | 4/2000 | Lawrence ..................... 341/87 |
| 6,111,567 | A | 8/2000 | Savchenko et al. |
| 6,118,817 | A * | 9/2000 | Wang .................... 375/240.03 |
| 6,120,149 | A * | 9/2000 | Hosoi ......................... 351/205 |
| 6,161,201 | A * | 12/2000 | Payne et al. ................... 714/43 |
| 6,195,692 | B1 * | 2/2001 | Hsu ............................ 725/110 |
| 6,209,041 | B1 | 3/2001 | Shaw et al. |
| 6,216,163 | B1 * | 4/2001 | Bharali et al. ............... 709/227 |
| 6,272,148 | B1 * | 8/2001 | Takagi et al. ............... 370/469 |
| 6,292,834 | B1 | 9/2001 | Ravi et al. |
| 6,314,492 | B1 | 11/2001 | Allen et al. |
| 6,327,421 | B1 | 12/2001 | Tiwari et al. |
| 6,329,165 | B1 * | 12/2001 | Chattoraj et al. ............. 435/29 |
| 6,343,298 | B1 | 1/2002 | Savchenko et al. |
| 6,385,647 | B1 | 5/2002 | Willis et al. |
| 6,405,256 | B1 | 6/2002 | Lin et al. |
| 6,449,269 | B1 | 9/2002 | Edholm |
| 6,502,135 | B1 | 12/2002 | Munger et al. |
| 6,611,868 | B1 * | 8/2003 | Arutyunov ................... 709/227 |
| 6,614,763 | B1 * | 9/2003 | Kikuchi et al. ............. 370/252 |
| 6,643,259 | B1 | 11/2003 | Borella et al. |
| 6,757,255 | B1 | 6/2004 | Aoki et al. |
| 6,765,878 | B1 | 7/2004 | Carlson |
| 6,772,375 | B1 | 8/2004 | Banga |
| 6,785,288 | B1 | 8/2004 | Enns et al. |
| 2002/0047899 | A1 | 4/2002 | Son et al. |
| 2002/0048448 | A1 | 4/2002 | Daniels |
| 2002/0049817 | A1 | 4/2002 | Drory et al. |
| 2002/0090027 | A1 | 7/2002 | Karczewicz et al. |
| 2003/0018799 | A1 | 1/2003 | Eyal |
| 2003/0236902 | A1 | 12/2003 | Weiss et al. |
| 2003/0236912 | A1 | 12/2003 | Klemets et al. |
| 2004/0003101 | A1 | 1/2004 | Roth et al. |

OTHER PUBLICATIONS

Microsoft; TAPI 3.0 Connection and Media Services: White Paper; Aug. 25, 1999; Collected from Microsoft web address: http://www.microsoft.com/windows2000/techinfo/howitworks/communications/telephony/tapiconnect.asp.*

Shannon, C. E.; A Mathematical Theory of Communication; Jul., Oct. 1948; The Bell System Technical Journal, vol. 27, pp. 379-423, 623-656.*

Muuss, Mike; The Story of the PING Program; Oct. 18th, 1999; retreived from the Internet Archive at: http://web.archive.org/web/19991018225218/ftp.arl.mil/~mike/ping.html.*

Muuss, Mike; The Research Interests of Mike Muuss; Oct. 8th, 1999; retreived from the Internet Archive at: http://web.archive.org/web/19991008020453/ftp.arl.mil/~mike/.*

Khalil et al., "Performance Considerations for TCP/IP in Wide Area Networks", IEEE, 1994, pp. 166-175.

Minshall G et al. "Application performance pitfalls and TCP's Nagle algorithm", vol. 27, No. 4, pp. 36-44, XP002233094 Performance Evaluation Review, Mar. 2000, ACM.

Hayes D A et al; "Impact of Flow Control on quality of service driven packet scheduling disciplines"; Control Applications, 1999. Proceedings of the 1999 IEEE International Conference on Control Applications; Kohala Coast, HI Aug. 22, 1999; pp. 1454-1459.

Nishida Y et al; "Congestion Control Mechanism for TCP with Packet Pair Scheme"; IEICE Transactions on Information and Systems, Institute of Electronics Information and Comm. Egn. Tokyo, JP, vol. E82-D, No. 4, Apr. 1999 pp. 854-862.

Moldeklev et al. "How a Large ATM MTU Causes Deadlocks in TCP Data Transfers", IEEE/ACM Transactions on Networking, vol. 3, No. 4, Aug. 1995, pp. 409-422.

Paknikar, Shantanu, et al. "A Caching and Streaming Framework for Multimedia," ACM Multimedia 2000, Los Angeles, CA; pp. 13-20.

Guo, Katherine, et al. "RCache: Design and Analysis of Scalable, Fault Tolerant Multimedia Stream Caching Schemes," Scalability and Traffic Control in IP Networks, Proceedings of SPIE vol. 4526, (2001); pp. 68-86.

Aboobaker, N., et al., "Streaming Media Congestion Control Using Bandwidth Estimation," Lecture Notes in Computer Science, 2002, vol. 2496, pp. 89-100.

Liefooghe, P., et al., "An Architecture for Seamless Access to Multicast Content, " Proceedings of the 26th Annual IEEE Conference on Local Computer Networks, Nov. 8, 2000, pp. 488-494.

Braun, T., et al., "Multicast for Small Conferences," Proceedings of the Sixth IEEE Symposium on Computers and Communications, Jul. 3, 2001, pp. 145-150.

Fleischman, E., "WAVE and AVI Codec Registries," Network Working Group Request for Comments: 2361, The Internet Society, Jun. 1998, pp. 1-71.

Camarillo, G., et al., "Grouping of Media Lines in the Session Description Protocol (SDP)," Network Working Group Request for Comments: 3388, The Internet Society, Dec. 2002, pp. 1-21.

Handley, M., et al., "SDP: Session Description Protocol," Network Working Group Request for Comments: 2327, The Internet Society, Apr. 1998, pp. 1-42.

"Advanced Systems Format (ASF) Specification," Revision 01.20.01e, Microsoft Corp., Sep. 2003, pp. i-vi and 1-93.

Schulzrinne, H., et al., "RTP: A Transport Protocol for Real-Time Applications," Network Working Group Request for Comments: 3350, Jul. 2003, pp. 1-104.

Schulzrinne, H., et al., "Real Time Streaming Protocol (RTSP)," Network Working Group Request for Comments: 2326; The Internet Society (Apr. 1998). pp. 1-92.

Jin, S., et al. "Accelerating Internet Streaming Media Delivery using Network-Aware Partial Caching," 2002 IEEE, pp. 153-160.

Fielding R. et al, "Hypertext Transfer Protocol—HTTP/1.1," Network Working Group Request for Comments: 2616; The Internet Society (Jun. 1999); Category; Standards Track. pp. 1-176.

Microsoft Computer Dictionary 5th Edition, p. 428.

Kamiyama N et al. "Renegotiated CBR transmission in interactive video-on-demand system", Multimedia Computing and Systems '97 Proceedings, IEEE International Conference Ottawa ONT Canada Jun. 3-6, 1997 pp. 12-19.

Petit G H et al. "Bandwidth resource optimization in video-on-demand network architectures", Community Networking Integrated Multimedia Services to the Home, 1994 Proceedings of the 1st Int'l Workshop San Francisco CA Jul. 13-14, 1994 pp. 91.

Lixin Gao et al. "Supplying instantaneous video-on-demand services using controlled multicast", Multimedia Computing and Systems, 1999, IEEE Int'l Conference on Florence Italy Jun. 7,11, 1999, pp. 117-121.

Dutta A et al. "A Streaming architecture for next generation internet", ICC 2001, 2001 IEEE Int'l Conference on Communications. Helsinky, Finland, Jun. 11-14, 2001, 1303-1309.

* cited by examiner

Fig. 1 (background)

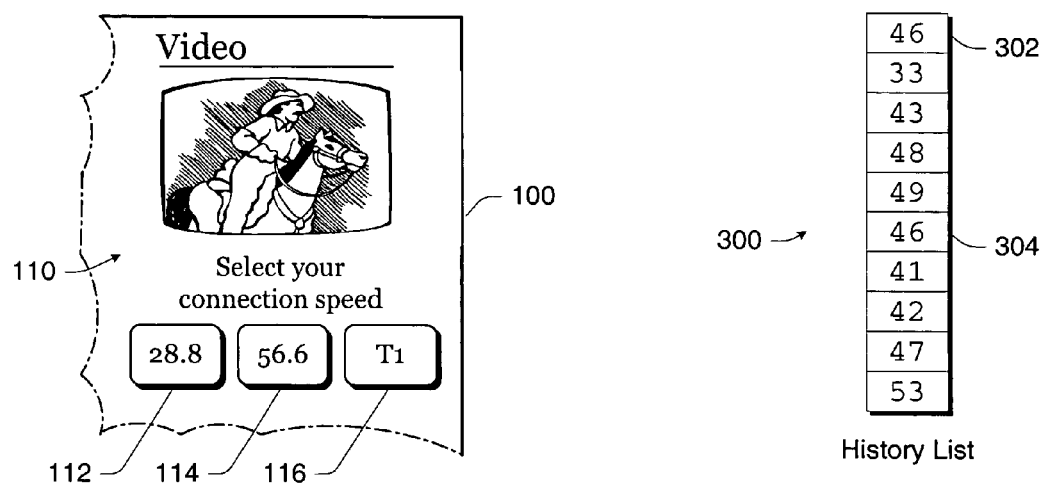
*Fig. 2*
*(background)*
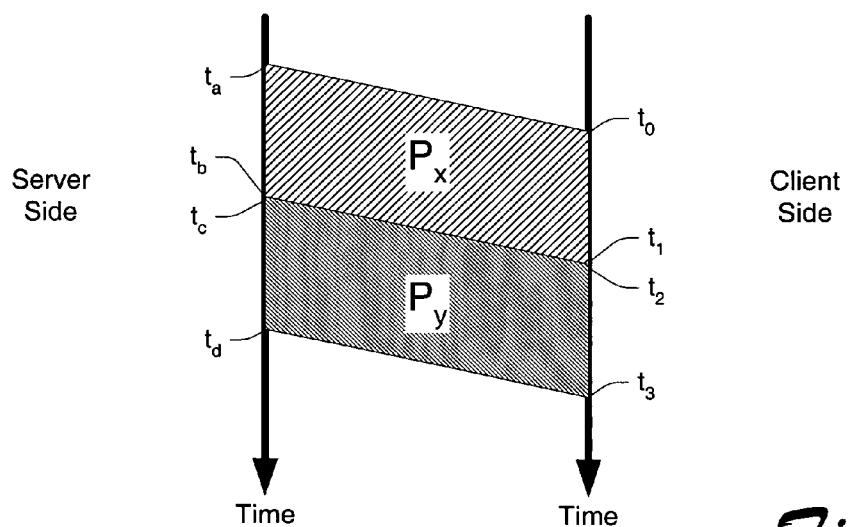
*Fig. 5*
*Fig. 3*
*(background)*

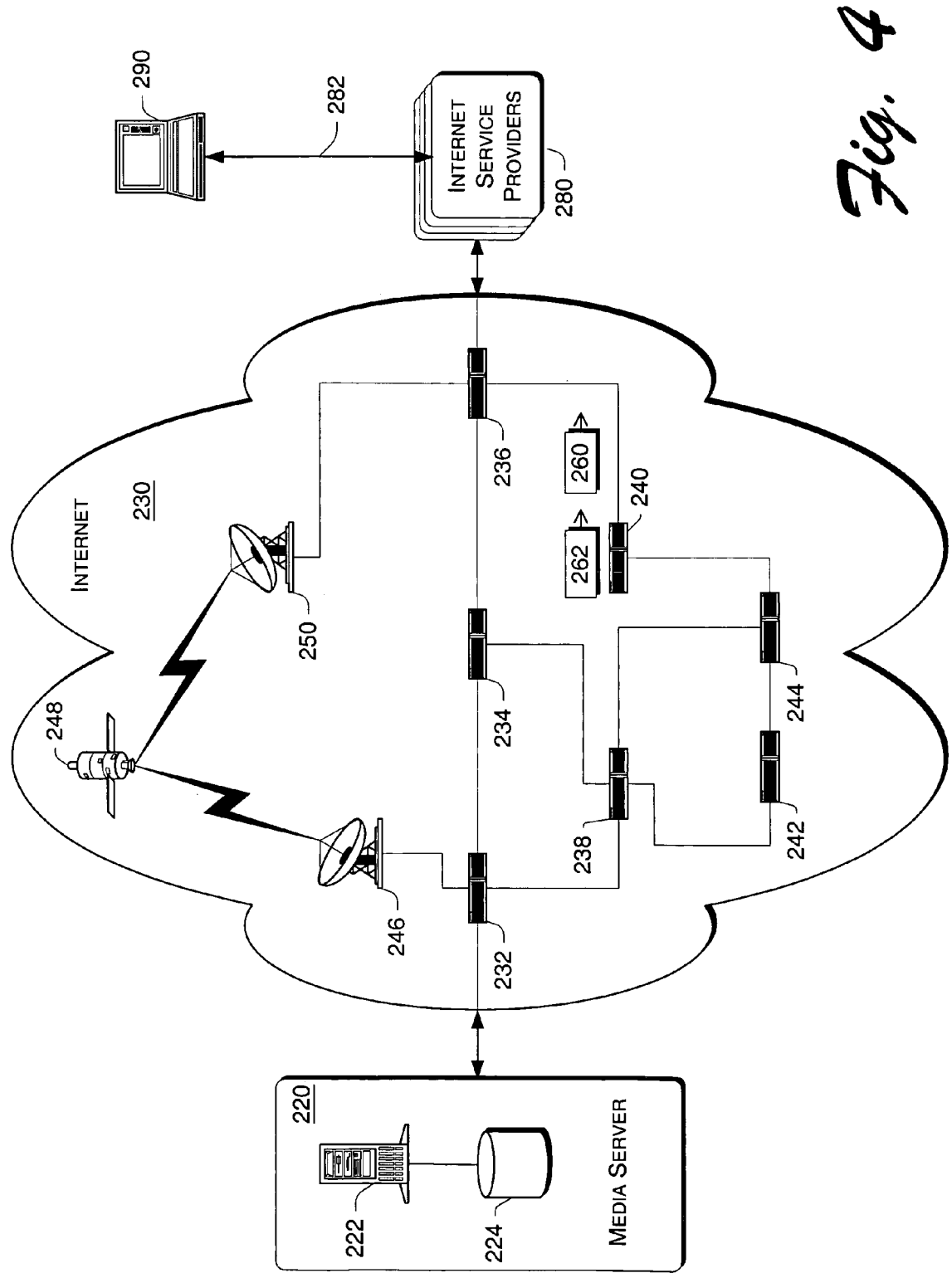

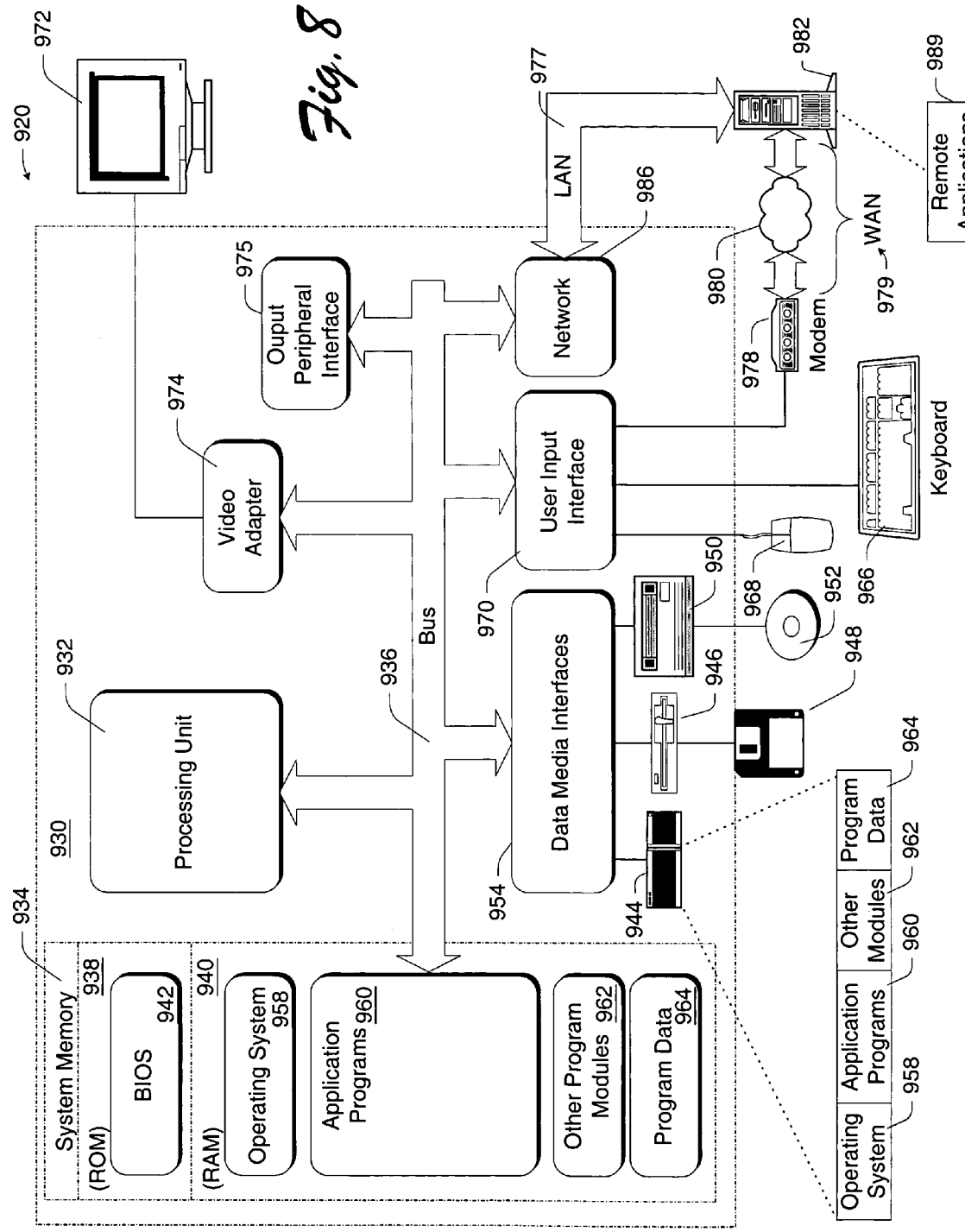

FAST DYNAMIC MEASUREMENT OF CONNECTION BANDWIDTH USING AT LEAST A PAIR OF NON-COMPRESSIBLE PACKETS HAVING MEASURABLE CHARACTERISTICS

TECHNICAL FIELD

This invention relates to dynamic detection of maximum bandwidth for a connection between to entities on a network.

BACKGROUND

As the Internet has matured, the format characteristics of the content available on the Internet have changed. Sound and video content is now mixed in with the traditional textual content. However, this new content on the Internet requires a greater connection speed (i.e., bandwidth) than was commonly available a few years ago.

FIG. 1 illustrates an example of a typical Internet configuration. It includes a server (such as media server 20), which is coupled to the Internet 30. The server typically includes one or more physical server computers 22 with one or more physical storage devices and/or databases 24. On the other side of an Internet transmission is a client 90, which is connected via one of many available Internet Service Providers (ISPs) 80. Herein, a server is a network entity that sends data and a client is a network entity that receives data.

Cloud 30 is labeled the Internet, but it is understood that this cloud represents that portion of the Internet that does not include the server, client's ISP, and the client. Inside such cloud are the routers, transmission lines, connections, and other devices that more-often-than-not successfully transmit data between clients and servers. Inside exemplary Internet cloud 30 are routers 32–44; two satellite dishes 46 and 50; and a satellite 48. These represent the possible paths that a data packet may take on its way between the server and the client.

Bandwidth

Bandwidth is the amount of data that can be transmitted in a fixed amount of time. For example, bandwidth between media server 20 in FIG. 1 to media client 90 is calculated by the amount of data (e.g., 1000 bits) that may be transmitted between them in a unit of time (e.g., one second).

As shown in FIG. 1, a transmission over the Internet travels across multiple links before it reaches its destination. Each link has its own bandwidth. Like a chain being only as strong as its weakest link, the maximum bandwidth between server 20 and client 90 is the link therebetween with the slowest bandwidth. Typically, that is the link (such as link 82 in FIG. 1) between the client 90 and its ISPs 80. That slowest bandwidth is the maximum de facto bandwidth.

Herein, unless otherwise apparent from the context, references to bandwidth between network entities (such as server 20 and client 90) is assumed to be the maximum de facto bandwidth therebetween.

Bandwidth may also be called "connection speed", "speed", or "rate". In references to bandwidth measured by bits per second, it may also be called "bit rate" or "bitrate."

Streaming Media

Streaming is a technique for transferring multimedia data such that it can be processed as a steady and continuous stream. Streaming technologies are becoming increasingly important with the growth of the Internet because most users do not have fast enough access to download large multimedia files quickly. With streaming, the client browser or plug-in can start displaying the data before the entire file has been transmitted.

For streaming to work, the client side receiving the data must be able to collect the data and send it as a steady stream to the application that is processing the data and converting it to sound or pictures. This means that if the streaming client receives the data more quickly than required, it needs to save the excess data in a buffer. If the data doesn't come quickly enough, however, the presentation of the data will not be smooth.

Within the context of an audio and/or visual presentation, "media" and "multimedia" are used interchangeably herein. Media refers to the presentation of text, graphics, video, animation, and/or sound in an integrated way.

"Streaming media" is an audio and/or visual presentation that is transmitted over a network (such as the Internet) to an end-user. Such transmission is performed so that the presentation is relatively smooth and not jerky. Long pauses while additional frames are being downloaded to the user are annoying to the user. These annoyances encourage a user to avoid viewing future streaming media.

Smoothly Transmitting Streaming Media

Since the bandwidth determines the rate at which the client will receive data, a streaming media presentation may only be presented at a rate no greater than what the bandwidth allows. For example, assume media server 20 needs to send data at 50 Kbps to the client 90 in order to smoothly "play" a streaming media presentation. However, the bandwidth between the client and server is only 30 Kbps. The result is a jerky and jumpy media presentation.

In an effort to alleviate this problem, streaming media presentations are often encoded into multiple formats with differing degrees of qualities. The formats with the lowest quality (e.g., small size, low resolution, small color palette) have the least amount of data to push to the client over a given time. Therefore, a client over a slow link can smoothly present the streaming media presentation, but the quality of the presentation suffers. The formats with the highest quality (e.g., full screen size, high resolution, large color palette) have the greatest amount of data to push to the client over a given time. Therefore, the client with a fast link can smoothly present the streaming media presentation and still provide a high quality presentation.

Select-a-Bandwidth Approach

When a server sends streaming media to a client, it needs to know what format to use. Thus, in order to select the proper format, the server must to know the bandwidth between the server and the client.

This easiest way to accomplish this is to ask the user of the client what their bandwidth is. Since a client's link to the Internet is typically the bandwidth bottleneck, knowing the bandwidth of this link typically indicates the actual bandwidth.

FIG. 2 shows a cut-away 100 of a Web page displayed on a client's computer. Inside the cut-away 100, is a typical user-interface 110 that may be used to ask a user what their connection speed is. The user clicks on one of the three buttons 112, 114, and 116 provided by the user-interface 110. If the user clicks on button 112, the server delivers data from a file containing streaming media in a format designed for transmission at 28.8 Kbps. Likewise, if the user clicks on button 114, data sends from a file containing streaming media in a format designed for transmission at 56.6 Kbps. If the user clicks on button 114, the server delivers data from a file containing streaming media in a format designed for transmission at a rate greater than 56.6 Kbps and up-to the typical speed of a T1 connection.

However, the primary problem with the "select-a-bandwidth" approach is that it requires a thoughtful selection by a user. This approach invites selection errors.

It requires that a user care, understand, and have knowledge of her connection speed. Often, a user does not pay particular attention to which button to press. The user may only know that a media presentation will appear if the user presses one of these buttons. Therefore, they press any one of them.

Often, a user does not understand the concept of bandwidth. A user may choose button 116 because she may want to see the presentation at its highest quality. This user does not realize that seeing the presentation at its highest quality may result in a non-smooth presentation because her Internet connection cannot handle the rate that the data is being sent through it.

If she does understand the concept of bandwidth, then the user may not know her bandwidth. A user may simply be ignorant of her bandwidth. In addition, varying degrees of noise may cause varying connection speeds each time a user connects to the Internet. Furthermore, some types of connections (such as a cable modem) can have wide degrees of connection speed depending upon numerous factors.

Moreover, the user needs to understand the implications of an incorrect choice. A user needs to be educated so that she understands that she needs to select an option that is equal to or less than her bandwidth to get a smooth presentation. But she should not choose one that is significantly less than her bandwidth. If she does, then she will be seeing a smooth presentation at a lower quality that she could otherwise see at a higher available bandwidth.

As can be seen by the above discussion, this manual approach is often confusing and intimidating to many user. Therefore, it often results in incorrect selections.

What's more, maintaining multiple files (one for each bandwidth) at the media server adds to the overhead of maintaining a Web site.

Automatic Bandwidth Detection

To overcome these problems, media servers use a single file containing subfiles for multiple bandwidths. Also, media servers automatically detect the bandwidth.

This single file is called a MBR (multiple bit rate) file. The MBR files typically include multiple differing "bands" or "streams." These bands may be called "subfiles." A user only clicks on one link. Automatically, behind the scenes, the server determines the right speed band to send to the client.

This automatic speed detection may take a long time. This means that an additional five seconds to a minute (or more) is added to the user's wait for the presentation to begin. This delay for existing automatic speed detection is because of long "handshaking" times while the speed determination is going on.

One existing automatic detection technique involves sending multiple data packets for measuring the speed between the server and client. This technique is described further below in the section titled, "Multiple Measurement Packets Technique."

Bandwidth Measurement Packets

Typically, automatic bandwidth detection techniques measure bandwidth between entities on a network by sending one or more packets of a known size.

FIG. 3 shows a time graph tracking the transmission of two such packets ($P_x$ and $P_y$) between a sender (e.g., server) and a receiver (e.g., client). The server and client sides are labeled so. On the graph, time advanced downwardly.

Time $t_a$ indicates the time at the server the transmission of $P_x$ begins. Time $t_b$ indicates the time at the server the transmission of $P_x$ ends. Similarly, Time $t_0$ indicates the time at the client begins receiving $P_x$. Time $t_1$ indicates the time at the client completes reception of $P_x$. At $t_1$, the network hardware presumably passes the packet up the communication layers to the application layer.

Packet $P_y$ is similarly labeled on the time graph of FIG. 3. $t_c$ is the server time at the transmission of $P_y$ begins. $t_d$ is the server time that the transmission of $P_y$ ends. Similarly, $t_2$ the client time that it begins receiving $P_y$, $t_3$ is the client time that it completes reception of $P_y$. At $t_3$, the network hardware presumably passes the packet up the communication layers to the application layer.

Bandwidth measurement using a single packet. In a controlled, laboratory-like environment, measuring bandwidth between two entities on a network is straightforward. To make such a calculation, send a packet of a known size from one entity to the other and measure the transmission latency, which is the amount of time it takes a packet to travel from source to destination. Given this scenario, one must know the time that the packet was sent and the time that the packet arrived.

This technique is nearly completely impractical outside of the laboratory setting. It cannot be used in an asynchronous network (like the Internet) because it requires synchronization between the client and server. Both must be using the same clock.

Alternatively, the client may track the time it begins receiving a packet (such as $t_0$ for $P_x$) and the time the packet is completely received (such as $t_1$ for $P_x$).

FIG. 3 shows packet $P_x$ being sent from a server to a client. $P_x$ has a known size in bits of PS. The formula for calculating bandwidth (bw) is $$bw(P_x) = \frac{PS}{t_1 - t_0} \quad \text{Formula 1 (Single Packet)}$$

This technique works in theory, but unfortunately does not work in practice. Only the hardware knows when a packet is initially received. Therefore, only the hardware knows when $t_0$ is.

The other communication layers (such as the transport layer and the application layer) can only discover the time when the packet is completely received by the hardware. That is when the hardware passes it up to them. This completion time for packet $P_x$ is $t_1$. It is not possible to calculate bandwidth only one knowing one point in time.

Packet-pair. A technique called packet-pair is used to overcome these problems in asynchronous networks. With packet-pair, two identical packets are sent back-to-back. The server sends a pair of packets, one immediately after the other. Both packets are identical; thus, they have the same size (PS). The bandwidth is determined by dividing the packet size by the time difference in reception of each packet.

Each packet has specific measurable characteristics. In particular, these characteristics include its packet size (PS) and the measured time such a packet arrives (e.g., $t_{0-3}$ in FIG. 3). Some characteristics (such as packet size) may be specified rather than measured, but they may be measured if so desired.

As shown in FIG. 3, the server sends packet, $P_x$. The client's hardware begins receiving the packet at $t_0$. When reception of the packet is complete at $t_1$, the hardware passes it up the communication layers. Ultimately, it is received by the destination layer (e.g., application layer) at presumably $t_1$.

After the server sends $P_x$ (which completed at $t_b$), it immediately sends packet $P_y$ at $t_c$. It is important that there be either 1) absolutely no measurable delay between $t_b$ and $t_c$ or 2) a delay of a known length between $t_b$ and $t_c$. Herein, to simplify the description, it will be assumed that there is no measurable delay between $t_b$ and $t_c$.

The client's hardware begins receiving $P_y$ at $t_2$. When reception of the packet is complete at $t_3$, the hardware passes it up the communication layers. Ultimately, it is received by the destination layer (e.g., application layer) at presumably $t_3$.

FIG. 3 shows no delay between $t_1$ (the time of completion of reception of $P_x$) and $t_2$ (the time reception of $P_y$ begins). Theoretically, this will always be the case if $P_x$ and $P_y$ are transmitted under identical conditions. In practice, is the often the case because $P_y$ is sent immediately after $P_x$.

Using packet-pair, the formula for calculating bandwidth (bw) is $$bw(P_x P_y) = \frac{PS}{t_3 - t_1} \quad \text{Formula 2 (Packet – Pair)}$$

This technique works in theory and in practice. However, it only works well over a network that is relatively static.

For example, in FIG. 1, assume the network consists of only the server 20; routers 32, 34, and 36; a specific ISP of ISPs 80; and client 90. Further, assume that the links between each node on this static network is fixed and has a consistent bandwidth. In this situation, the packet-pair techniques provide an accurate and effective measurement of bandwidth.

Packet-pair does not work well over the Internet. However, the packet-pair technique does not work well over a dynamic network, like the Internet. A dynamic network is one where there is a possibility that a packet may be handled in a manner different from an earlier packet or different from a later packet.

FIG. 1 illustrates examples of those handling differences. Assume that all packets are traveling from the server to the client (from left to right in FIG. 1). Assume that packets 60–68 were sent back-to-back by the server 20 to the client 90. Assume that packet 70 was sent by another server (not shown) to the client 90 and it is unrelated to bandwidth measurement.

Notice, as illustrated in FIG. 1, that packets may take different routes. In addition, some routes may significantly delay the packet transmission. This is especially true if the packet is transmitted via an apparently unusual (but not necessarily uncommon) route, such as wireless transmission, oversees via an underwater cable, satellite transmission (as shown by dishes 46 and 50 and satellite 48), etc.

A router (such as router 42) may delay a packet (such as 64) more than another may by temporarily buffering it. Another packet (such as packet 70) from another source may slip in between two packets (such as packets 60 and 62). In addition, a modem (not shown) of the client may compress packets.

Communications equipment (such as a modem) may compress a packet (such as 66) to shrink the packet size and thus speed along transmission. Such packet compression can significantly affect the bandwidth measurement because not all of the subsequent data packets will be compressed or compressed at the same rate.

Multiple Measurement Packets Technique

To overcome these problems, conventional automatic bandwidth measurement techniques uses multiple packets. A server sends several (much more than two) packets and calculates the speed of each. Conventional wisdom on bandwidth measurement indicates that in order to get accurate measurements several pairs of packets must be sent repeatedly over several seconds to several minutes. Herein, this technique is called "multiple-packets" to distinguish it from the above-described "packet-pair" technique.

Typically, the ultimate bandwidth is determined by finding the average of the many bandwidth measurements. This averaging smoothes out variances in delays for each packet; however, it does not compensate for packet compression during transmission. One of two extremely incorrect measurements will skew the average.

Unfortunately, this technique takes a long time relative the existing wait for the user between click and media presentation. A long time may be five seconds to several minutes depending on the data and the situation. Such a delay adds to the annoyance factor for the user who wishes experience the media presentation. This is not an acceptable delay. Since there are no other options available using conventional techniques, the user has be forced to endure these delays.

Moreover, these conventional approaches typically use TCP to transmit the packets. Using TCP introduces additional delays for handshaking. These conventional approaches typically modify the kernel of the operating system (usually the transport layer) to do perform these measurements.

No existing automatic bandwidth measurement can nearly instantaneously measure bandwidth across the Internet using a pair of packets. No existing automatic bandwidth measurement can make such measurements at the application layer. Thus, it avoids modifying the operating system. No existing automatic bandwidth measurement addresses measurement distortion caused by packet compression.

SUMMARY

The fast dynamic measurement of connection bandwidth utilizes a single pair of packets to calculate bandwidth between two entities on a network (such as the Internet). This calculation is based upon the packet-pair technique. This bandwidth measurement is extremely quick.

On its journey across a network, communication equipment and modems may compress a packet. This compression shrinks the size of the packet; thus, it can distort the bandwidth calculation using such a shrunken packet. To avoid this distortion, the fast dynamic measurement of connection bandwidth employs non-compressible packets. More specifically, it employs highly entropic packets. Therefore, a packet cannot be compressed during its journey.

In addition, on its journey across a network, packets may be rerouted, delayed, misrouted, and the like. These momentary delays may result in a momentary bad bandwidth calculation. This problem is ameliorated by using a history list at the client that keeps track of recent measurements. The client returns the median of that list to the server. That median is the specified bandwidth.

BRIEF DESCRIPTION OF THE DRAWINGS

FIG. 2 is cut-away portion of a Web page. The cut-away shows a user interface providing a user a mechanism for selecting the bandwidth. This shows a conventional technique for determining bandwidth.

FIG. 3 shows a packet pair (being sent from a server to a client) graphed in the time domain. This shows a conventional implementation of packet-pair technique to measure bandwidth.

FIG. 4 also illustrates a typical public networking environment (such as the Internet). This shows a pair of packets sent back to back.

FIG. 5 is visual representation of a history list of the last ten measured bandwidths.

FIG. 8 is an example of a computing operating environment capable of implementing the server side and/or the of the exemplary bandwidth meter.

DETAILED DESCRIPTION

Figure 1:
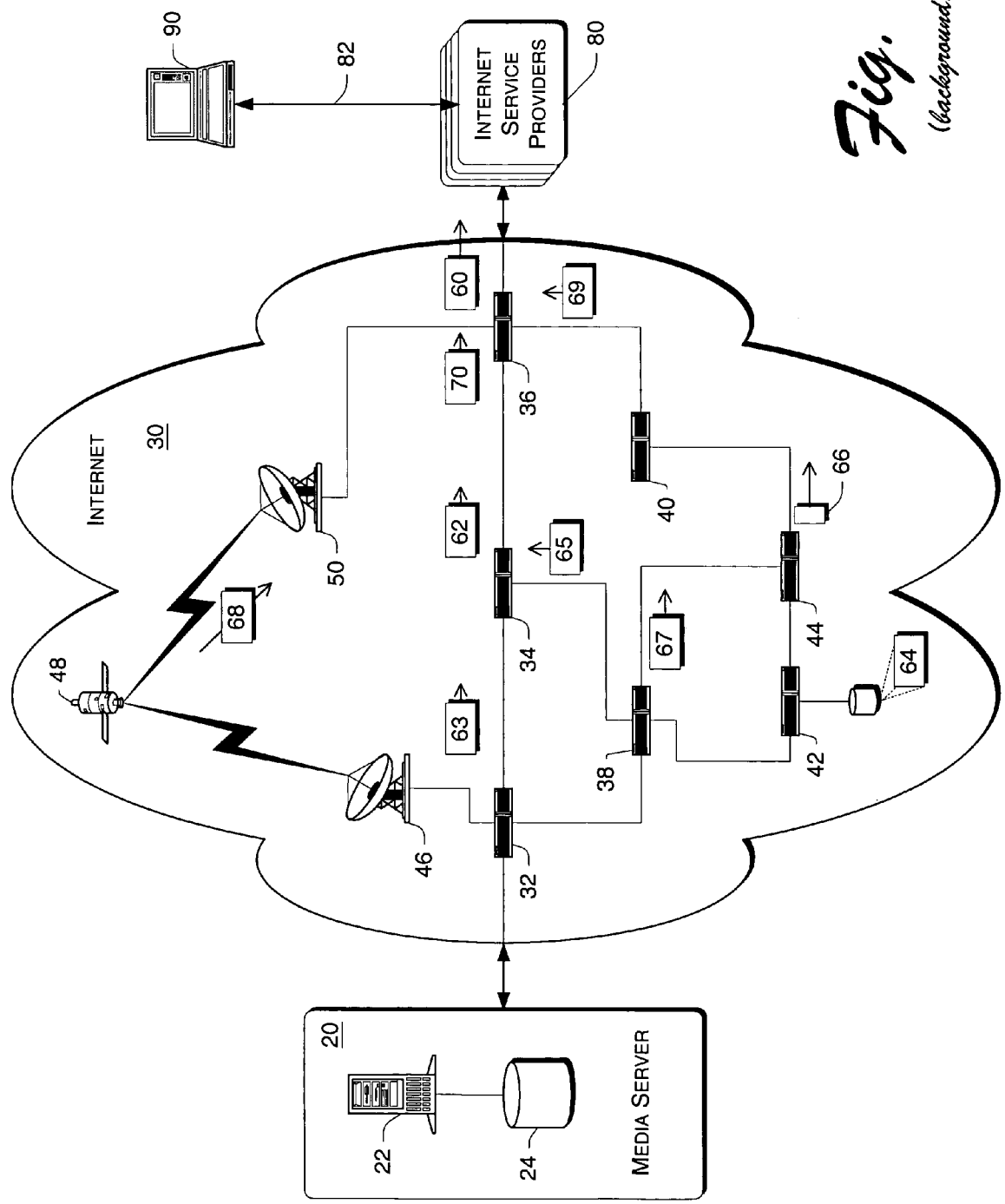
FIG. 1 illustrates a typical public networking environment (such as the Internet) and the routing of and delay of data packets sent from a server to a client.

The following description sets forth a specific embodiment of the fast dynamic measurement of connection bandwidth that incorporates elements recited in the appended claims. This embodiment is described with specificity in order to meet statutory written description, enablement, and best-mode requirements. However, the description itself is not intended to limit the scope of this patent.

Rather, the inventors have contemplated that the claimed fast dynamic measurement of connection bandwidth might also be embodied in other ways, in conjunction with other present or future technologies. Even when used with a public network (such as the Internet), an exemplary fast dynamic measurement of connection bandwidth (i.e., "bandwidth meter" or "bw-meter") described herein is fast and robust. The exemplary bandwidth meter implements a low-latency technique for automatically measuring the network bandwidth available between two entitles on a communications network. It has been found to be particularly useful over the Internet (or other such public networks).

Unlike the conventional approaches, the exemplary bw-meter obtains a best effort bandwidth measurement with the least possible delay, even under difficult network conditions. The exemplary bw-meter is designed to provide reasonable output in less than one second in most existing networks, including LANs, cable, DSL, and modem connections.

Furthermore, the exemplary bw-meter is implemented at the application layer (rather than other layers like the transport and physical layers). Although the exemplary bw-meter may be implemented on other layers, the one described herein is implemented on the application layer. In particular, it may be partially implemented by a Web browser or a media player.

Packet-Pair Technique

The exemplary bw-meter utilizes the well-established packet-pair technique described above and illustrated in FIG. 3. The exemplary bw-meter uses the packet-pair formula (Formula 2) described above to calculate the maximum de facto bandwidth between two entities on a communications network (such as the Internet).

Unlike existing automatic bandwidth measurement techniques that use multiple packets, the exemplary bw-meter uses a single pair of packets for measuring bandwidth over the Internet. With the exemplary bw-meter, bandwidth measurements and calculations are made "nearly instantaneously" because only a single pair of measurement packets is sent. The term "nearly instantaneously" means that the bandwidth is determined as soon as the pair of packets arrive at the client.

The exemplary bw-meter overcomes the drawbacks and limitations of using packet-pairs over the Internet by employing non-compressible packets and a history list.

Non-Compressible Packets

Data compression. Storing data in a format that requires less space than it would otherwise is data compression. Alternatively, it is transmitting data in a format that requires less bandwidth than it would otherwise.

Data compression is particularly useful in communications because it enables devices to transmit the same amount of data in fewer bits. There is a variety of data compression techniques. Some are lossless (no data loss by compression) and some are lossy (some data loss by compression).

In general, lossless techniques are used in communication. These techniques compress data by representing long data patterns by short codes. Thus, some data is more compressible than others are.

Entropy. A measure of the inherent compressible characteristics of a data is "entropy." It may be defined to be a measure of the number of bits necessary to transmit (or store) data as a function of the probability that the message will consist of a specific set of symbols (i.e., recognizable data patterns).

Data with low entropy means that the data has many recognizable patterns and it may be significantly compressed. Data with high entropy means that the data has few (to zero) recognizable patterns and it may be minimally (to zero) compressed. Herein, "highly entropic" data is data that contains nearly no recognizable patterns; thus, compression of such data is nearly identical in size to the data when uncompressed.

Contents of packets contain no information. For measuring bandwidth, the contents of the packets contain no information. If the packets used for measuring bandwidth remain the same size throughout transmission, the actual contents of the packets do not affect the measurement.

Since the content carries no semantic information (meaning), the packet's contents may be any data, regardless of meaning, that is not compressible. More specifically, the data of the packets of the exemplary bw-meter are highly entropic to prevent (or greatly reduce the affect of) data compression during transmission.

Alternatively, the content of the packets may contain information useful to the client or server, but that information will be highly entropic.

Packet Containing Highly Entropic Data. With the exemplary bw-meter, the packets sent include highly entropic data. This means that the data in the packets are not compressible.

One of the problems of using a conventional packet-pair technique is that some modems and some communications equipment compress the packets. If this happens, the bandwidth calculation will be off because the size of the packets may have been alternated during the transmission. If the packets are highly entropic, then the packets cannot be compressed; thus, the results of the bandwidth calculations can be relied upon.

A packet containing highly entropic data (i.e., "highly entropic packet") of the packet-pair technique of the exemplary bw-meter travels from the sending entity (e.g., server) to the receiving entity (e.g., client). Since it is highly entropic, it is not successfully compressed along its journey. FIG. 4 shows an example of such a journey. FIG. 4 illustrates an environment similar to that shown in FIG. 1.

FIG. 4 illustrates an example of a typical Internet configuration. It includes a server (such as media server 220), which is coupled to the Internet 230. The server typically includes one or more physical server computers 222 with one or more physical storage devices and/or databases 224. On the other side of an Internet transmission is a client 290, which is connected via its Internet Service Providers (ISPs) 280.

Cloud 230 is labeled the Internet, but it is understood that this cloud represents that portion of the Internet that does not include the server, client's ISPs, and the client. Inside such cloud are the routers, transmission lines, connections, and other devices that more-often-than-not successfully transmit data between clients and servers. Inside exemplary Internet cloud 230 are routers 232–244; two satellite dishes 246 and 250; and a satellite 248. These represent the possible paths that a data packet may take on its way between the server and the client.

FIG. 4 shows successive packets 260 and 262 of the pair sent in accordance with the exemplary bw-meter. The server 220 sends packet 262 immediately after packet 260. As shown in FIG. 4, neither packet 260 nor 262 are compressed.

Adaptable Compression Countermeasure. In addition, the entropic data included in the packets is regularly changed. Some communications equipment and modems may adaptively compress otherwise uncompressible data if it sees the exact same data repeatedly. These devices "learn" how to compress entropic data. They do this by storing the data and using a short code to represent it.

Therefore, the entropic content of the packets is altered regularly so that adaptable compression techniques cannot "compress" the otherwise non-compressible data. In the exemplary bw-meter, a set of 20–50 different entropic packets is regularly used.

Large Packets

A packet's size is a based upon the number of data bits contained therein. It is preferable to use large packets to measure bandwidth. It is analogous to getting better statistical data when one has a larger sample. However, if a packet becomes too large, it will be fragmented during transmission by communications equipment. If any fragment of a packet is delayed, then the timing (e.g., to-$t_3$ as shown in FIG. 3) may be off.

Thus, it is preferable to avoid fragmentation. Therefore, the exemplary bw-meter employs a package with a size as large enough as possible but just small enough to avoid fragmentation. Herein, this size is called "fragmentation-avoidance" size or simply "frag-avoid." Thus, this frag-avoid size refers to the largest size possible before a packet is divided during transmission.

For example, if it is known that any packet over 1000 bits is fragmented but none below 1000 are fragment, then the fragmentation-avoidance size is 999 bits.

UDP packets. With the exemplary bw-meter, the packet pair is composed of a 1472 byte UDP packet immediately followed by a 1472 byte UDP (User Datagram Protocol) packet. Both packets contain highly entropic data to guarantee that the packets remain 1472 bytes long across all the hops in the network.

Although UDP is preferred, the packets (such as measurement packets 260 and 262 in FIG. 4) may be any protocol format. When sent via the Internet, the measurement packets of the exemplary bw-meter are sent via TCP or UDP.

TCP (Transmission Control Protocol) is one of the main protocols in TCP/IP networks (such as the Internet). Whereas the IP protocol deals only with packets, TCP enables two hosts to establish a connection and exchange streams of data. TCP guarantees delivery of data and guarantees that packets will be delivered in the same order in which they were sent.

UDP is a connectionless protocol that (like TCP) runs on top of IP networks. Unlike TCP/IP, UDP/IP provides very few error recovery services, offering instead a direct way to send and receive packets (i.e., datagram) over an IP network.

With the exemplary bw-meter, UDP packets are preferred over TCP packets. Some applications handle TCP packets in a non-standard fashion. An example of such an application is the software from America Online (AOL). Instead of delivering the packets to the application upon receipt, the AOL software delivers packets at specific time intervals. This time-delivery granularity greatly distorts the bandwidth measurement. These non-standard applications, like AOL, do not handle UDP packets in such a manner.

Furthermore, TCP includes additional administrative traffic that UDP does not include. In TCP, when a packet is sent, the client must send an acknowledgement (i.e., "ack"). The kernel (i.e., the transport layer) of the operating system handles this acknowledgement process.

For example, suppose that the second packet is lost. Since the client did not receive a second packet, it does not send an ack. Since the server receives no ack, the server sends the second packet again. Therefore, the application eventually receives its expected second packet. However, it has no way to know that this is a resend of the second packet. The bandwidth measurement will be distorted because of the delay introduced by a packet loss and resend. With TCP packets, it is possible to get a bad measurement and have no way of knowing that it is a bad measurement. That is a bad combination.

With UDP, when a packet is lost, the client never gets it. Thus, the application knows if the measurement is bad because it never gets the second packet. UDP can be controlled at the application level better than TCP can.

When exemplary bw-meter is used across a firewall, TCP packets are preferred over UDP. Most firewalls do not allow UDP packets to flow across them.

History List

The nearly instantaneous bandwidth measurement described above is quick and efficient. As shown in FIG. 1, packets may be delayed for many reasons. These cause of these delays and the amount of the delays may vary from moment to moment. Thus, this bandwidth measurement at a particular moment in time may not reflect the actual bandwidth typically experienced. The calculated bandwidth for each measurement may be slightly off for various reasons. Occasionally, it will be extremely off.

FIG. 5 shows an example of a history list 300 of recorded bandwidth measurement. The client keeps this history of calculated bandwidths to ameliorate the affect of such momentary delays. The exemplary bw-meter uses the median of the history of bandwidth as the proper speed. Using the history list lessens the impact of one or two erroneous measurement.

Items are added and removed from the list in a LIFO (last in, first out) fashion. Therefore, the last ten measurements are always included in the list.

Experience has shown that the median of a ten-item history tends to give a good approximation of the actual bandwidth. Although the list can be any size that gives a good approximation of the actual bandwidth.

The history list 300 of FIG. 5 includes ten items. Each item is a recorded bandwidth measurement taken when the client accessed a media file. The median of this list is 46 Kbps as shown at item 302 and 304. Therefore, a server will choose a media file that is formatted to be sent at 46 Kbps or slower.

Instead of using the median, the exemplary bw-meter may use some other statistical derivation, such as an average. The median is preferred over the average because the median is less likely to be skewed by an extremely incorrect (too low or too high) entry.

With a history list, a good estimation of the link bandwidth may be calculated very quickly, after receiving just one packet pair. Therefore, a presentation may be presented right away. Conventional multi-packet approaches need to send many packet pairs one after the other. This results in a significant delay before for the player starts displaying a video presentation once the user clicks "play." This is usually very annoying for users, so it is not acceptable.

Flushing the History List. The history list is completely cleared (i.e., "flushed") from time to time. In particular, this is done each time a new connection to the Internet is established. This can be determined by the use of a new IP address.

Each time a modem connects to the Internet the speed can be significantly different from the recent past. Many factors, such as line noise, affect this connection speed. For example, assume that a client has a history list like that shown in FIG. 5. On the next connection, user is given a new IP address. Also, the modem connects at 26 Kbps and replaced item 302 with 26. The media is still 46 Kbps, but the current speed is actually 26 Kbps. Therefore, the server will overrun the modem when it sends a file at 46 Kbps.

Therefore, flushing the history list upon an IP address change alleviates this problem.

This problem typically does not occur in LANs (Local Area Networks), DSL, cable modem, or other similar dedicated Internet connections. In these situations, the IP addresses rarely if ever change.

Modem Query

If the exemplary bw-meter gets a measurement that is below a low-believability threshold or above a high-believability threshold, it will disregard the results. These thresholds define the "range of believability" for the results. If the result is below the low-believability threshold, the exemplary bw-meter will not believe that the bandwidth is that low. Likewise, if the result is above the high-believability threshold, the exemplary bw-meter will not believe that the bandwidth is that high.

In the exemplary bw-meter, low-believability threshold is 24.4 Kbps and the high-believability threshold is 1 Mbps. The range of possible measurements between these thresholds is called the "believability" range.

The following exemplary pseudocode restricts a variable called "HistoryMedian" to possible values that it can take. Typically, the range is from 24,000 to 1,000,000.

```
if (HistoryMedian > 1,000,000)
{
return UnlimitedBandwidth; //needed for OS jitter issues
}
else
{
return max (24,000, HistoryMedian); //ensure a floor of 24,000 is always set
}
```

There is a registry entry (HardCodedRegistryValue) that, if present, takes precedence over the output of the exemplary bw-meter.

When the result fall outside the believability range, the exemplary bw-meter asks the modem of the client for its speed. Also, in this situation, the median of the history list will still be used as the proper bandwidth measurement, but the query of the modem will provide the new entry into the list.

The exemplary bw-meter may ask the operating system (OS) of the client. The OS tends to give poor bandwidth estimations. Thus, the exemplary bw-meter asks the modem (using TAPI). The modems do not give great bandwidth estimations, but they tend to be better than the OS.

It has been discovered that some modems react poorly when asked for their bandwidth measurement. Examples of poor reactions include system crashes.

To avoid this with certain operating systems (such as Windows 95®, Windows 98®, Windows NT®, Windows 2000® by the Microsoft Corporation), the exemplary bw-meter specifically looks for an adapter with a MAC address starting with "44-45". This indicates the presence of a PPP device. If this exists, the exemplary bw-meter calls TAPI. Otherwise, the exemplary bw-meter does not call TAPI.

Methodological Implementation

Figure 6:
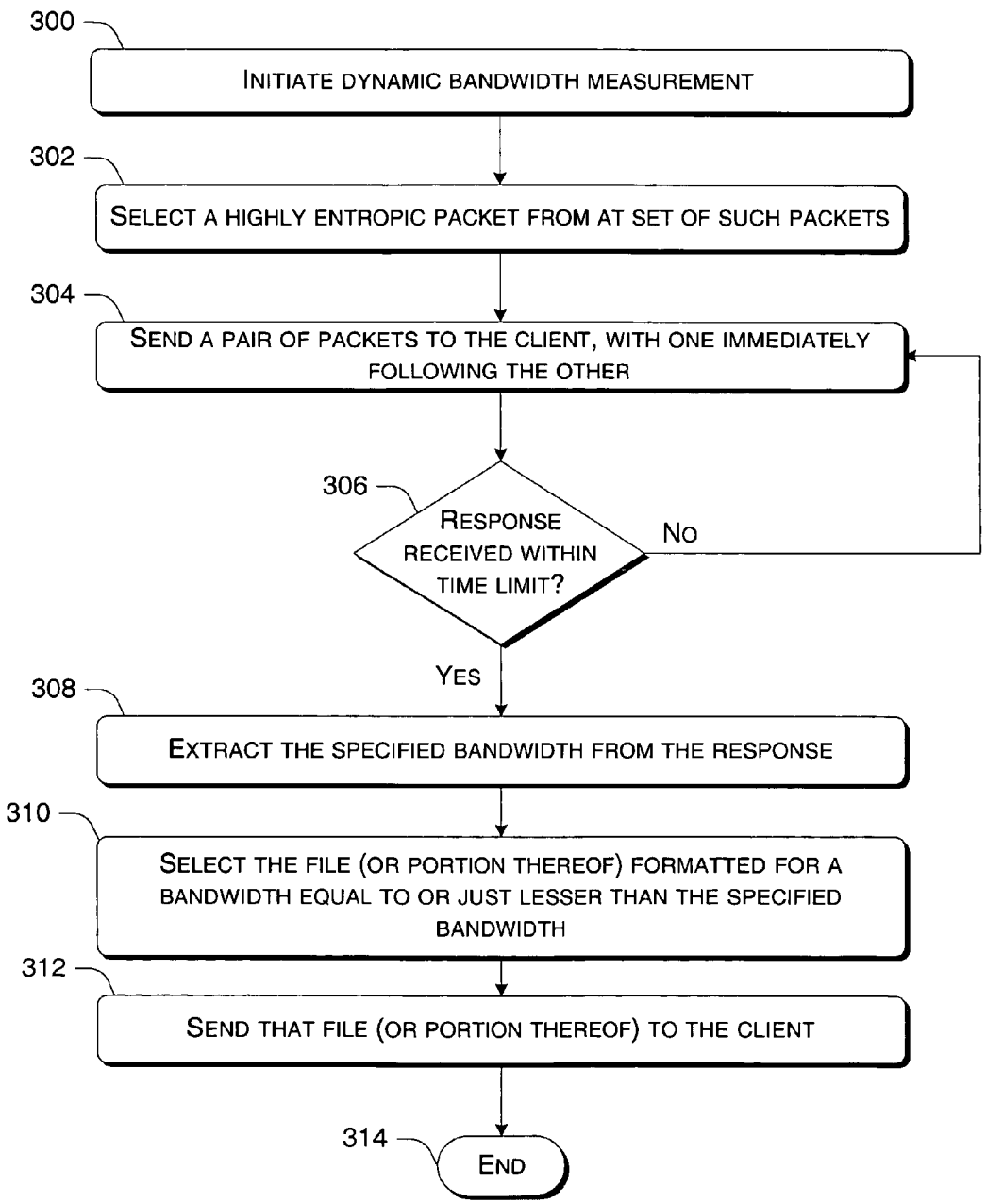
FIG. 6 is a flowchart illustrating the methodology of an implementation of the server side of the exemplary bandwidth meter.

Server Side. FIG. 6 shoes a methodological implementation of the server side of the exemplary bandwidth meter. At 300, the dynamic bandwidth measurement in accordance with the exemplary bandwidth meter is initiated. Typically, a user of the client selects an option on a Web page to experience a media presentation. Alternatively, an application on the client may initiate such bandwidth measurement. Such an application may be a Web browser, media player, or the like.

At 302 of FIG. 6, the server selects a highly entropic packet from at set of such packets. The server has a set of packets from which to choose. Each packet in the set is highly entropic. This selection may be via any fashion, such as revolving and random. The packet may be selected at that moment or it may have been pre-selected. Alternatively, the highly entropic packet may be calculated using formula known to generate entropic data.

At 304, the server sends a pair of packets to the client, with one immediately following the other. These packets are identical and highly entropic. Alternatively, the packets may be different, but they will have the same size. Each packet is preferably frag-avoid size.

At 306, the server waits for a response from the client. If it is not received within time limit, the process returns to sending a pair of packets at 304. Alternatively, the server may send a pair of packets without waiting for a response. Although not shown in the flowchart, the process will repeat this a given number of times before terminating and generating an error. If a response is received within the time limit, the process proceeds to the next block at 308.

The response includes a bandwidth measurement determined by the client using the pair of packets sent by the server at 304. The server extracts the specified bandwidth from the response at 308.

At 310 of FIG. 6, the server selects the file (or portion thereof) formatted for a bandwidth equal to or just lesser than the specified bandwidth. At 312, the server sends the file (or portion thereof) to the client.

If it was a media, file the user of the client enjoys a media presentation that begins play quickly. It also plays smoothly and at the highest quality possible at a measured bandwidth. The process ends at 314.

Figure 7:
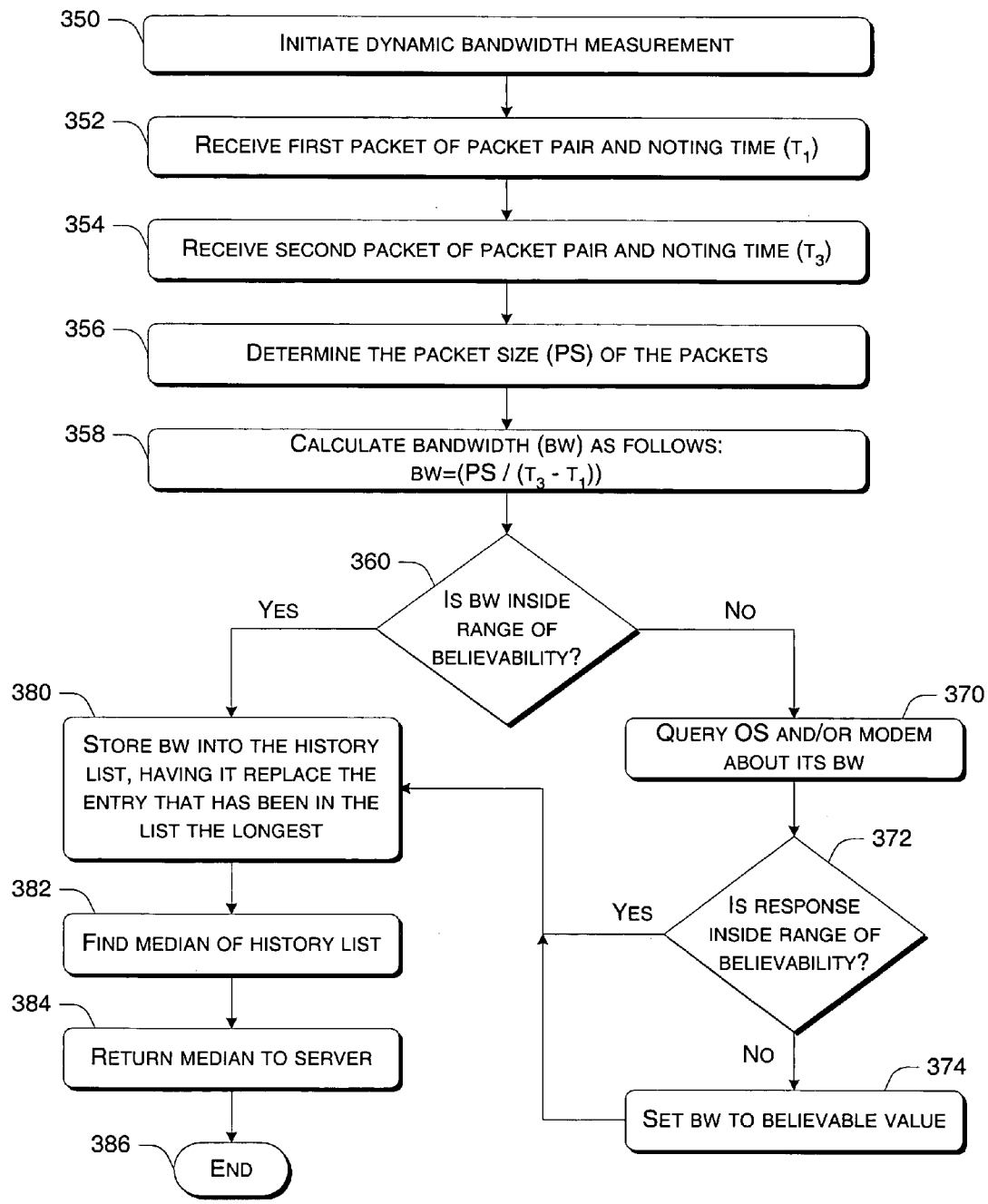
FIG. 7 is a flowchart illustrating the methodology of an implementation of the client side of the exemplary bandwidth meter.

Client Side. FIG. 7 shoes a methodological implementation of the client side of the exemplary bandwidth meter. At 350, the dynamic bandwidth measurement in accordance with the exemplary bandwidth meter is initiated. This initiation occurs in the same as described above for initiation from the server perspective.

At 352, the client receives a first packet of packet-pair. This is like packet $P_x$ in FIG. 3. The client notes and stores the time that it receives this packet. This is like time $t_1$ shown in FIG. 3.

At 354 of FIG. 7, the client receives a second packet of packet-pair. This is like packet $P_y$ in FIG. 3. The client notes and stores the time that it receives this packet. This is like time $t_3$ shown in FIG. 3.

At 356 of FIG. 7, the client determines the packet size (PS) of the packets. This may be known constant. This may be provided by handshaking data between the server and the client. This may be encoded in the contents of the packets. The client may simply measure this.

At 358, the client calculates the measured bandwidth using the packet-pair formula (Formula 2) above. Such formula is repeated here:

$$bw(P_x P_y) = \frac{PS}{t_3 - t_1} \quad \text{Formula 2 (Packet – Pair)}$$

At 360, the client determines if the calculated bandwidth is inside range of believability. This is the range of measurements that are believable. It is defined to be between the low-believability threshold (e.g., 24.4 Kbps) and the high-believability threshold (e.g., 1 Mbps).

If the client determines that the calculated bandwidth is inside range of believability, then the process proceeds to block 380 described below.

If it is outside the range, then the client queries the operating system (OS) and/or modem to determine what they believe the current bandwidth to be. If current bandwidth specified by the OS and/or the modem is outside the range of believability, then set bandwidth to be a believable value. For example, set the bandwidth to the low-believability threshold (e.g., 24.4 Kbps) if it is below that threshold. Alternatively, set the bandwidth to the high-believability threshold (e.g., 1 Mbps) if the it is above that threshold. Go to block 380 described below If current bandwidth specified by the OS and/or the modem is inside the range of believability, then go to block 380 described below.

At 380 in FIG. 7, the client stores the bandwidth into the history list. The new entry replaces the entry that has been in the list the longest. If this is a new connection, the client flushes the list and enters the bandwidth as the only entry.

At 382 and 384, the client finds the median of history list and returns it to the server. At 386, the process ends.

Additional Exemplary Implementation Details

On the server side, the exemplary bw-meter is designed to run in one of three modes: MMSU (Microsoft Multimedia Server UDP), MMST (Microsoft Multimedia Server TCP), and HTTP (Hypertext Transport Protocol). The MMSU mode is used when the connection between the server and the client is such that the media packets can be sent over UDP. In other words, when there is no proxy computer between the server and the player, or, if there is one, when the proxy computer lets UDP traffic go across. The MMST mode is used if the firewall allows TCP traffic to port 1755, but does not allow any kind of UDP traffic. Finally, the HTTP mode is used if the firewall only allows TCP traffic on port 80.

The following is examples of pseudocode that a client may use when communicating with a server in MMSU mode:

```
if (HardCodedRegistryValue)
{
return HardCodedRegistryValue;
}
else If (PP measurement successful)
{
If PP < 24 Kbps, save 24 Kbps in history, and then return
    HistoryMedian;
else save PP measurement in history, and then return
    HistoryMedian;
}
else //Case where UDP PP fails
{
else if history is not empty, return HistoryMedian;
else if TAPI supported device, return (TAPI - 14%);
else return UnlimitedBandwidth;
}
```

The following is examples of pseudocode that a client may use when communicating with a server in MMST mode:

```
if (HardCodedRegistryValue)
{
return HardCodedRegistryValue;
}
else if HistoryMedian exists, return HistoryMedian;
else if TAPI supported device
{
if (V4.1 server)
{
   TCP based PP measurement and save to history; //since
      packets are high entropy, may be good measurement
   return max (24,000, HistoryMedian);
}
else //v4.0 and v3 server
{
   if HistoryMedian exists, return max (24,000, History-
      Median); //We don't trust PP sample else return TAPI
      - 14%
}
}
else if (V4.1 Server | | V4.0 Server)
{
TCP based PP measurement and save to history; //not a
   modem, entropy not a concern
return max (24,000, HistoryMedian));
}
else if HistoryMedian exists, return HistoryMedian;
else return UnlimitedBandwidth;
```

The following is examples of pseudocode that a client may use when communicating with a server in HTTP mode:

```
if (HardCodedRegistryValue)
{
return HardCodedRegistryValue;
}
else if history is not empty, return HistoryMedian;
else if TAPI supported device, return (TAPI - 14%);
else return unlimited bandwidth;
```

Exemplary Computing Environment

FIG. 8 illustrates an example of a suitable computing environment 920 on which the exemplary bw-meter may be implemented.

Exemplary computing environment 920 is only one example of a suitable computing environment and is not intended to suggest any limitation as to the scope of use or functionality of the exemplary bw-meter. Neither should the computing environment 920 be interpreted as having any dependency or requirement relating to any one or combination of components illustrated in the exemplary computing environment 920.

The exemplary bw-meter is operational with numerous other general purpose or special purpose computing system environments or configurations. Examples of well known computing systems, environments, and/or configurations that may be suitable for use with the exemplary bw-meter include, but are not limited to, personal computers, server computers, thin clients, thick clients, hand-held or laptop devices, multiprocessor systems, microprocessor-based systems, set top boxes, programmable consumer electronics, wireless phones, wireless communication devices, network PCs, minicomputers, mainframe computers, distributed computing environments that include any of the above systems or devices, and the like.

The exemplary bw-meter may be described in the general context of computer-executable instructions, such as program modules, being executed by a computer. Generally, program modules include routines, programs, objects, components, data structures, etc. that perform particular tasks or implement particular abstract data types. The exemplary bw-meter may also be practiced in distributed computing environments where tasks are performed by remote processing devices that are linked through a communications network. In a distributed computing environment, program modules may be located in both local and remote computer storage media including memory storage devices.

As shown in FIG. 8, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 930 typically includes a variety of computer readable media. Such media may be any available media that is accessible by computer 930, and it includes both volatile and non-volatile media, removable and non-removable media.

In FIG. 8, the system memory includes computer readable media in the form of volatile, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 8 illustrates a hard disk drive 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 948, optical disk 952, ROM 938, or RAM 940, including, by way of example, and not limitation, an operating system 958, one or more application programs 960, other program modules 962, and program data 964.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through an user input interface 970 that is coupled to bus 936, but may be connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface 975.

Computer 930 may operate in a networked environment using logical connections to one or more remote computers, such as a remote computer 982. Remote computer 982 may include many or all of the elements and features described herein relative to computer 930.

Logical connections shown in FIG. 8 are a local area network (LAN) 977 and a general wide area network (WAN)

979. Such networking environments are commonplace in offices, enterprise-wide computer networks, intranets, and the Internet.

When used in a LAN networking environment, the computer 930 is connected to LAN 977 network interface or adapter 986. When used in a WAN networking environment, the computer typically includes a modem 978 or other means for establishing communications over the WAN 979. The modem 978, which may be internal or external, may be connected to the system bus 936 via the user input interface 970, or other appropriate mechanism.

Depicted in FIG. 8, is a specific implementation of a WAN via the Internet. Over the Internet, computer 930 typically includes a modem 978 or other means for establishing communications over the Internet 980. Modem 978, which may be internal or external, is connected to bus 936 via interface 970.

In a networked environment, program modules depicted relative to the personal computer 930, or portions thereof, may be stored in a remote memory storage device. By way of example, and not limitation, FIG. 8 illustrates remote application programs 989 as residing on a memory device of remote computer 982. It will be appreciated that the network connections shown and described are exemplary and other means of establishing a communications link between the computers may be used.

Exemplary Operating Environment

FIG. 8 illustrates an example of a suitable operating environment 920 in which the exemplary bw-meter may be implemented. Specifically, the exemplary bw-meter is implemented by any program 960–962 or operating system 958 in FIG. 8.

The operating environment is only an example of a suitable operating environment and is not intended to suggest any limitation as to the scope of use of functionality of the bw-meter described herein. Other well known computing systems, environments, and/or configurations that may be suitable for use with the bw-meter include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Computer-Executable Instructions

An implementation of the exemplary bw-meter may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the exemplary bw-meter may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

The exemplary bw-meter is superior to conventional approaches because it is faster and more accurate. It is faster to send one pair of packets to measure bandwidth than multiple packets. It is more accurate because the packets are not compressible and it includes a history list. This exemplary bw-meter has been extensively tested in many different types of networks. In more than ninety percent (90%) of the cases, the results are within ten percent (10%) of the expected bitrates.

Although the fast dynamic measurement of connection bandwidth has been described in language specific to structural features and/or methodological steps, it is to be understood that the fast dynamic measurement of connection bandwidth defined in the appended claims is not necessarily limited to the specific features or steps described. Rather, the specific features and steps are disclosed as preferred forms of implementing the claimed fast dynamic measurement of connection bandwidth.

The invention claimed is:

1. A method for measuring bandwidth between two entities on a communications network, the method comprising:
    via a communications network, receiving at least a pair of non-compressible packets having measurable characteristics;
    calculating bandwidth based upon, measurable characteristics of at least the pair of non-compressible packets; and
    determining if the calculated bandwidth is outside a given range of believability for calculated bandwidth, wherein the given range of believability for calculated bandwidth is 24.4 Kbps–1 Mbps, a low-believability threshold is 24.4 Kbps and a high-believability threshold is 1 Mbps;
    if the calculated bandwidth is determined to be outside the given range of believability for calculated bandwidth:
        disregarding the calculated bandwidth; and
        querying a modem of an entity about a bandwidth setting of the modem.

2. A method as recited in claim 1, wherein the queried modem is a modem of a receiving entity.

3. A method as recited in claim 1, wherein the queried modem is a modem of a sending entity.

4. A method for measuring bandwidth between two entities on a dynamic network, the method comprising:
- via a dynamic network, sending at least a pair of non-compressible packets, the dynamic network being a communications network having no assurance that both packets of a pair of identical packets are handled in an identical manner while in transit on the communications network;
- receiving a bandwidth value determined based upon measurements related to at least the pair of non-compressible packets, and consideration of a given range of believability related to calculated bandwidth, wherein the given range of believability related to calculated bandwidth is 24.4 Kbps–1 Mbps, a low-believability threshold is 24.4 Kbps and a high-believability threshold is 1 Mbps;
- selecting a file formatted for a given bandwidth that is equal to or less than the bandwidth value; and
- sending the selected file via the dynamic network.

5. A method as recited in claim 4, wherein each of the pair of non-compressible packets is approximately fragmentation-avoidance size.

6. A method as recited in claim 4, wherein each of the pair of non-compressible packets is highly entropic.

7. A method as recited in claim 4, wherein each of the pair of non-compressible packets is formatted for TCP.

8. A method as recited in claim 4, wherein each of the pair of non-compressible packets is formatted for UDP.

9. A method as recited in claim 4, wherein the packets of the pair are equivalent in size.

10. A method as recited in claim 4, before the sending, further comprising selecting one of the pair of non-compressible packets from a set of differing non-compressible packets.

11. A method as recited in claim 4, before the sending, further comprising generating the pair of non-compressible packets.

12. A method as recited in claim 4, wherein the dynamic network is the Internet.

13. A method as recited in claim 4, wherein the bandwidth value received is within the given range of believability related to calculated bandwidth.

14. A method, comprising:
- via a communications network, receiving at least a pair of non-compressible packets having measurable characteristics;
- calculating bandwidth based upon, measurable characteristics of at least the pair of non-compressible packets; and
- determining if the calculated bandwidth is outside a given range of believability for calculated bandwidth,
- if the calculated bandwidth is determined to be outside the given range of believability for calculated bandwidth:
  - setting a bandwidth to a low-believability threshold if the calculated bandwidth is below the given range of believability for calculated bandwidth; and
  - setting a bandwidth to a high-believability threshold if the calculated bandwidth is above the given range of believability for calculated bandwidth,
  - wherein the given range of believability for calculated bandwidth is 24.4 Kbps–1 Mbps, the low-believability threshold is 24.4 Kbps and the high-believability threshold is 1 Mbps.

15. A method as recited in claim 14, wherein each of the pair of non-compressible packets is highly entropic.

16. A method as recited in claim 14, wherein each of the pair of non-compressible packets is formatted for TCP.

17. A method as recited in claim 14, wherein each of the pair of non-compressible packets is formatted for TCP.

18. A method as recited in claim 14, wherein the packets of the pair are equivalent in size.

19. One or more computer-readable storage media having computer-readable instructions stored thereon which, when executed by a computer processor, implement a method for measuring bandwidth between two entities on a communications network, the method comprising:
- via a communications network, receiving at least a pair of non-compressible packets having measurable characteristics;
- calculating bandwidth based upon, measurable characteristics of at least the pair of non-compressible packets; and
- determining if the calculated bandwidth is outside a given range of believability for calculated bandwidth, wherein the given range of believability for calculated bandwidth is 24.4 Kbps–1 Mbps, a low-believability threshold is 24.4 Kbps and a high-believability threshold is 1 Mbps;
- if the calculated bandwidth is determined to be outside the given range of believability for calculated bandwidth:
  - disregarding the calculated bandwidth; and
  - querying a modem of an entity about a bandwidth setting of the modem.

20. The one or more computer-readable storage media of claim 19, wherein the queried modem is a modem of receiving entity.

21. The one or more computer-readable storage media of claim 19, wherein the queried modem is a modem of sending entity.

22. One or more computer-readable storage media having computer-readable instructions stored thereon which, when executed by a computer processor, implement a method for measuring bandwidth between two entities on a communications network, the method comprising:
- via a dynamic network, sending at least a pair of non-compressible packets, the dynamic network being a communications network having no assurance that both packets of a pair of identical packets are handled in an identical manner while in transit on the communications network;
- receiving a bandwidth value determined based upon measurements related to at least the pair of non-compressible packets, and consideration of a given range of believability related to calculated bandwidth, wherein the given range of believability related to calculated bandwidth is 24.4 Kbps–1 Mbps, a low-believability threshold is 24.4 Kbps and a high-believability threshold is 1 Mbps;
- selecting a file formatted for a given bandwidth that is equal to or less than the bandwidth value; and
- sending the selected file via the dynamic network.

23. The one or more computer-readable storage media of claim 22, wherein each of the pair of non-compressible packets is approximately fragmentation-avoidance size.

24. The one or more computer-readable storage media of claim 22, wherein each of the pair of non-compressible packets is highly entropic.

25. The one or more computer-readable storage media of claim 22, wherein each of the pair of non-compressible packets is formatted for TCP.

26. The one or more computer-readable storage media of claim 22, wherein each of the pair of non-compressible packets is formatted for UDP.

27. The one or more computer-readable storage media of claim 22, wherein the packets of the pair are equivalent in size.

28. The one or more computer-readable storage media of claim 22, further comprising, before the sending, selecting one of the pair of non-compressible packets from a set of differing non-compressible packets.

29. The one or more computer-readable storage media of claim 22, further comprising, before the sending, generating the pair of non-compressible packets.

30. The one or more computer-readable storage media of claim 22, wherein the dynamic network is the Internet.

31. One or more computer-readable storage media having computer-readable instructions stored thereon which, when executed by a computer processor, implement a method, comprising:

via a communications network, receiving at least a pair of non-compressible packets having measurable characteristics;

calculating bandwidth based upon, measurable characteristics of at least the pair of non-compressible packets; and determining if the calculated bandwidth is outside a given range of believability for calculated bandwidth, if the calculated bandwidth is determined to be outside the given range of believability for calculated bandwidth:

setting a bandwidth to a low-believability threshold if the calculated bandwidth is below the given range of believability for calculated bandwidth; and setting a bandwidth to a high-believability threshold if the calculated bandwidth is above the given range of believability for calculated bandwidth, wherein the given range of believability for calculated bandwidth is 24.4 Kbps–1 Mbps, the low-believability threshold is 24.4 Kbps and the high-believability threshold is 1 Mbps.

32. The one or more computer-readable storage media of claim 31, wherein each of the pair of non-compressible packets is highly entropic.

33. The one or more computer-readable storage media of claim 31, wherein each of the pair of non-compressible packets is formatted for TCP.

34. The one or more computer-readable storage media of claim 31, wherein each of the pair of non-compressible packets is formatted for UDP.

35. The one or more computer-readable storage media of claim 31, wherein the packets of the pair are equivalent in size.

* * * * *